United States Patent
Kim et al.

(10) Patent No.: US 10,299,083 B2
(45) Date of Patent: May 21, 2019

(54) METHOD FOR PROVIDING CONTINUITY OF MBMS SERVICE AND DEVICE SUPPORTING THE SAME

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1 day.

(21) Appl. No.: 15/662,104

(22) Filed: Jul. 27, 2017

(65) Prior Publication Data

US 2018/0035265 A1    Feb. 1, 2018

Related U.S. Application Data

(60) Provisional application No. 62/369,182, filed on Jul. 31, 2016.

(51) Int. Cl.
| | |
|---|---|
| *H04W 4/06* | (2009.01) |
| *H04W 76/27* | (2018.01) |
| *H04W 48/12* | (2009.01) |
| *H04W 36/08* | (2009.01) |
| *H04W 36/24* | (2009.01) |
| *H04W 36/18* | (2009.01) |
| *H04W 36/36* | (2009.01) |

(52) U.S. Cl.
CPC .......... *H04W 4/06* (2013.01); *H04W 48/12* (2013.01); *H04W 76/27* (2018.02); *H04W 36/08* (2013.01); *H04W 36/18* (2013.01); *H04W 36/24* (2013.01); *H04W 36/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,319,917 | B2 * | 4/2016 | Tamura | H04W 24/10 |
| 2008/0253312 | A1 * | 10/2008 | Park | H04W 76/38 370/311 |
| 2008/0287129 | A1 * | 11/2008 | Somasundaram | H04W 36/0055 455/436 |
| 2013/0039250 | A1 * | 2/2013 | Hsu | H04H 20/71 370/312 |
| 2013/0194941 | A1 * | 8/2013 | Lu | H04W 52/0254 370/252 |
| 2013/0301509 | A1 * | 11/2013 | Purnadi | H04L 65/4076 370/312 |
| 2014/0036676 | A1 * | 2/2014 | Purnadi | H04W 36/0055 370/235 |

(Continued)

*Primary Examiner* — Warner Wong
(74) *Attorney, Agent, or Firm* — Lee Hong Degerman Kang Waimey

(57) ABSTRACT

Disclosed are: a method for providing continuity of a multimedia broadcast multicast service (MBMS) service, and a device supporting the same. The method may include: entering a radio resource control (RRC) connected state with respect to a first cell; receiving MBMS-related system information from the first cell; determining whether a mobility condition for continuity of an MBMS service is satisfied based on the received system information; and entering an RRC idle state when it is determined that the mobility condition is satisfied, and the UE does not supports a handover operation.

6 Claims, 12 Drawing Sheets

(56) References Cited

U.S. PATENT DOCUMENTS

| | | | | |
|---|---|---|---|---|
| 2014/0140237 A1* | 5/2014 | Ma | .......... | H04W 24/08 |
| | | | | 370/252 |
| 2014/0341059 A1* | 11/2014 | Jang | .......... | H04W 48/06 |
| | | | | 370/252 |
| 2015/0092554 A1* | 4/2015 | Mochizuki | .......... | H04W 24/10 |
| | | | | 370/235 |
| 2015/0098383 A1* | 4/2015 | Ding | .......... | H04W 4/06 |
| | | | | 370/312 |
| 2015/0163706 A1* | 6/2015 | Wang | .......... | H04W 48/20 |
| | | | | 455/436 |
| 2015/0208379 A1* | 7/2015 | Lin | .......... | H04W 4/06 |
| | | | | 370/312 |
| 2015/0358940 A1* | 12/2015 | Zhang | .......... | H04W 4/06 |
| | | | | 370/312 |
| 2018/0014251 A1* | 1/2018 | Sambhwani | .......... | H04L 5/0055 |
| 2018/0160274 A1* | 6/2018 | Byun | .......... | H04W 88/14 |

\* cited by examiner

METHOD FOR PROVIDING CONTINUITY OF MBMS SERVICE AND DEVICE SUPPORTING THE SAME

CROSS-REFERENCE TO RELATED APPLICATIONS

Pursuant to 35 U.S.C. § 119(e), this application claims the benefit of U.S. Provisional Patent Application No. 62/369,182, filed on Jul. 31, 2016, the contents of which are hereby incorporated by reference herein in its entirety.

BACKGROUND OF THE INVENTION

Field of the Invention

The present invention relates to a method for providing the continuity of an MBMS service by a user equipment (UE) not supporting a handover operation, and a device supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas.

Recently, research has been actively conducted on Internet of Things (IoT), which is communication between devices or between a device and a server without human interaction, that is, human intervention. IoT refers to a concept that a machine, not a user equipment (UE) used by a human, communicates using an existing wireless communication network.

Since IoT has different characteristics from a general UE, a service optimized for IoT communication may be different from a service optimized for human-to-human communication. IoT communication may be distinguished from a current mobile network communication service by a different market scenario, data communication, low cost and effort, a very large number of potential IoT devices, a wide service area, and low traffic per IoT device.

As one of IoT technologies, a narrowband IoT (NB-IoT) technology is emerging. NB-IoT is a low-power wide-area (LPWA) IoT technology using an LTE frequency, which is frequently used for tracking, sensing, and metering that involves the intermittent transmission of low-capacity data. A UE supporting the NB-IoT technology needs to be used for a long time without battery replacement and thus is required to operate with extremely low power.

SUMMARY OF THE INVENTION

A user equipment (UE) used in narrowband Internet of Things (NB-IoT) is required to operate with low power and thus supports only minimum functions for communication with a base station. For example, an NB-IoT UE does not support a handover function in an RRC connected state. Therefore, when the UE connected to a specific cell moves to another cell, the UE may have a radio link failure (RLF), in which case the UE is unable to receive a multimedia broadcast multicast service (MBMS) service of interest.

According to one embodiment of the present invention, there is provided a method for providing continuity of an MBMS service in a wireless communication system, the method including: entering a radio resource control (RRC) connected state with respect to a first cell; receiving MBMS-related system information from the first cell; determining whether a mobility condition for continuity of an MBMS service is satisfied based on the received system information; and entering an RRC idle state when it is determined that the mobility condition is satisfied, wherein the mobility condition comprises a condition that a UE is interested in receiving the MBMS service, a condition that the MBMS service is not provided via a first frequency provided by the first cell, a condition that the MBMS service is provided via a second frequency provided by a second cell, and a condition that the MBMS service is already being provided or is to be provided within a set time, and the UE does not supports a handover operation.

The method may further include performing a cell reselection procedure with respect to the second cell.

The method may further include transmitting an RRC connection request message to the second cell after the performing of the cell reselection procedure.

The method may further include receiving the MBMS service of interest via the second frequency from the second cell after the performing of the cell reselection procedure.

The MBMS service of interest may be received through multicast-broadcast single-frequency network (MBSFN) transmission or single cell point-to-multipoint (SC-PTM) transmission.

The MBMS-related system information may be a system information block 15 (SIB15).

According to another embodiment of the present invention, there is provided a UE providing continuity of an MBMS service in a wireless communication system, the UE including: a memory; a transceiver; and a processor to connect the memory and the transceiver, wherein the processor is configured to: enter an RRC connected state with respect to a first cell; receive MBMS-related system information from the first cell; determine whether a mobility condition for continuity of an MBMS service is satisfied based on the received system information; and enter an RRC idle state when it is determined that the mobility condition is satisfied, the mobility condition comprises a condition that a UE is interested in receiving the MBMS service, a condition that the MBMS service is not provided via a first frequency provided by the first cell, a condition that the MBMS service is provided via a second frequency provided by a second cell, and a condition that the MBMS service is already being provided or is to be provided within a set time, and the UE does not supports a handover operation.

The processor may be configured to perform a cell reselection procedure with respect to the second cell.

The processor may be configured to transmit an RRC connection request message to the second cell after the cell reselection procedure is performed.

The processor may be configured to receive the MBMS service of interest via the second frequency from the second cell after the cell reselection procedure is performed.

The processor may receive the MBMS service of interest through MBSFN transmission or SC-PTM transmission.

The MBMS-related system information may be an SIB15.

When a UE satisfies a predetermined condition, the UE may initiate a radio resource control (RRC) connection re-establishment procedure, may enter an RRC idle state, or may consider that an RRC connection is suspended, thereby providing the continuity of an MBMS service.

According to another embodiment of the present invention, there is provided a method for providing continuity of an MBMS service in a wireless communication system, the method comprising: entering a radio resource control (RRC) connected state with respect to a first cell; receiving MBMS-related system information from the first cell; determining whether a mobility condition for continuity of an MBMS service is satisfied based on the received system information; and initiating RRC connection re-establishment procedure to a cell which provides the MBMS service when it is determined that the mobility condition is satisfied, wherein the UE does not supports a handover operation.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
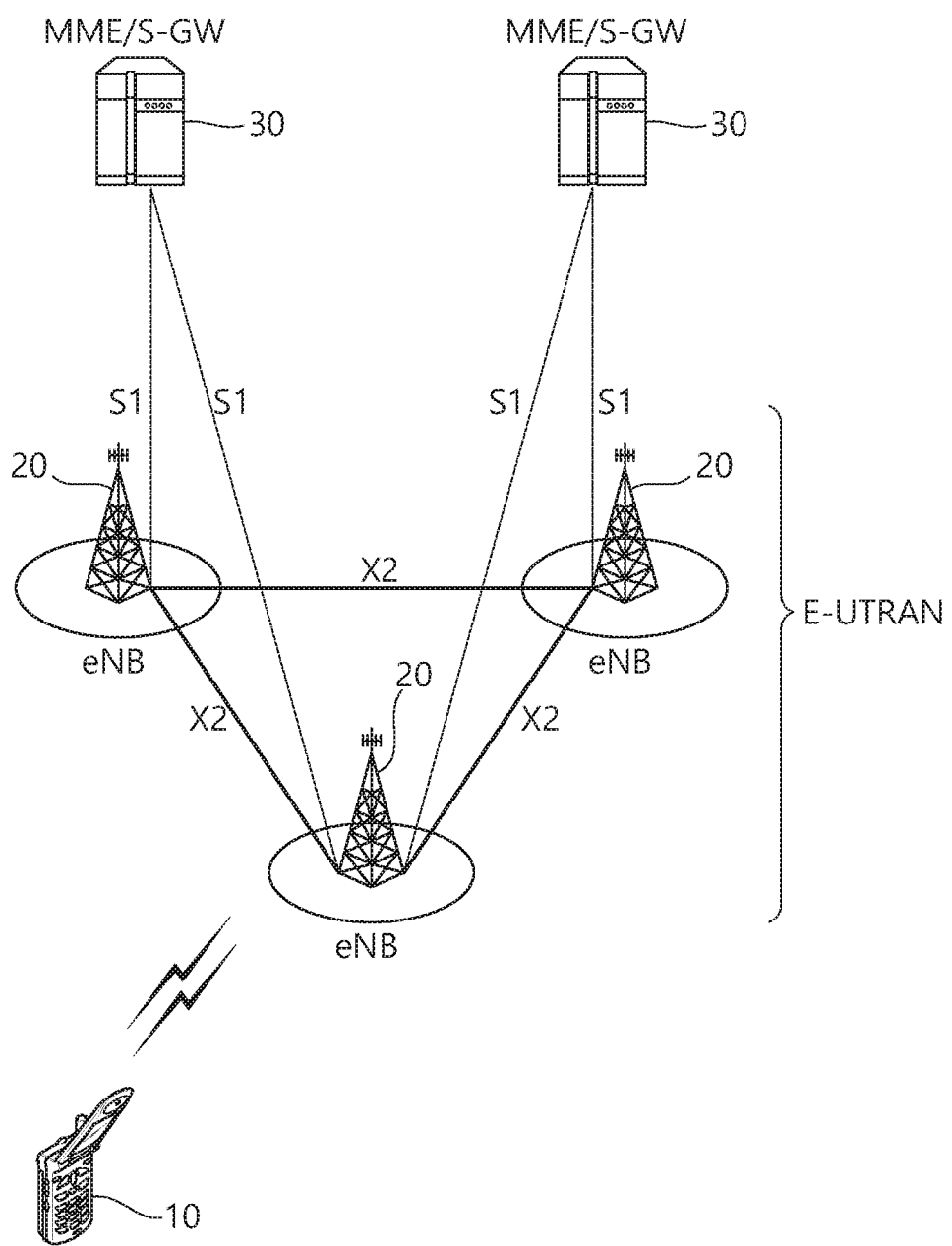
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
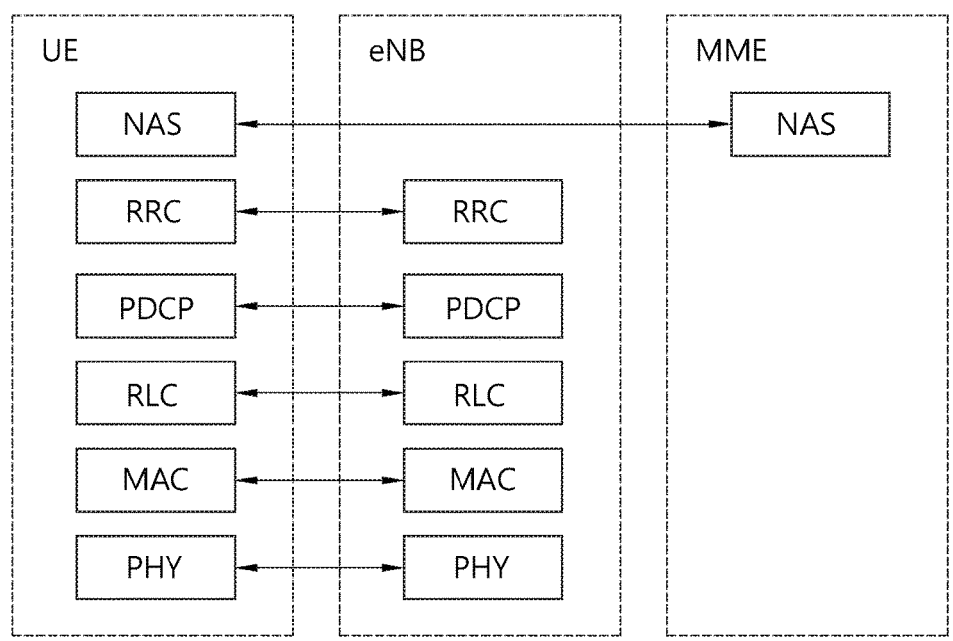
FIG. 2 shows a block diagram of a control plane protocol stack of an LTE system.
Figure 3:
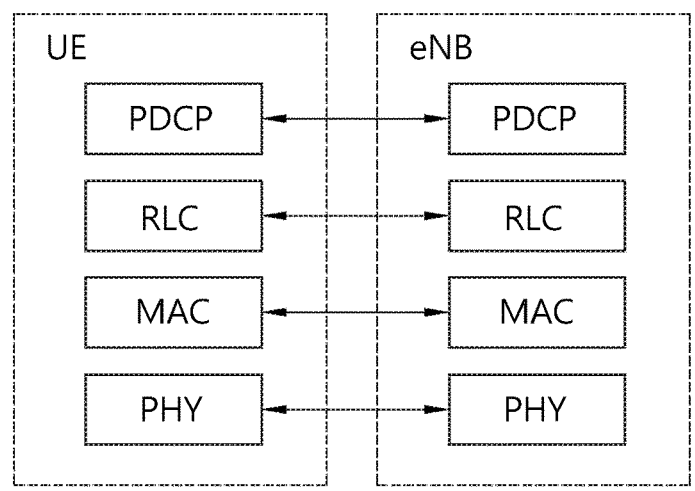
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
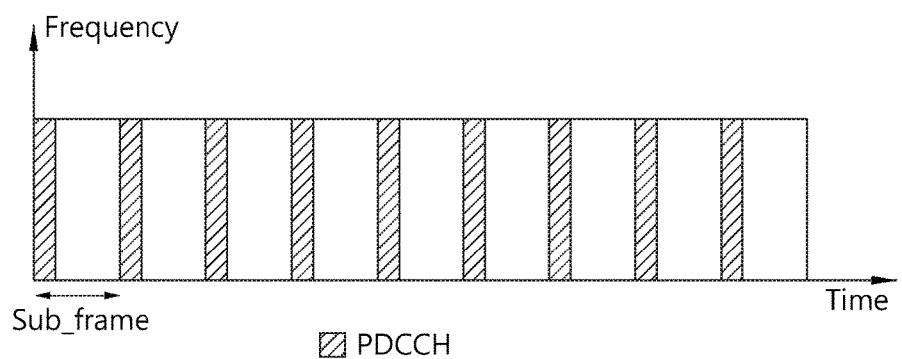
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described.

Figure 5:
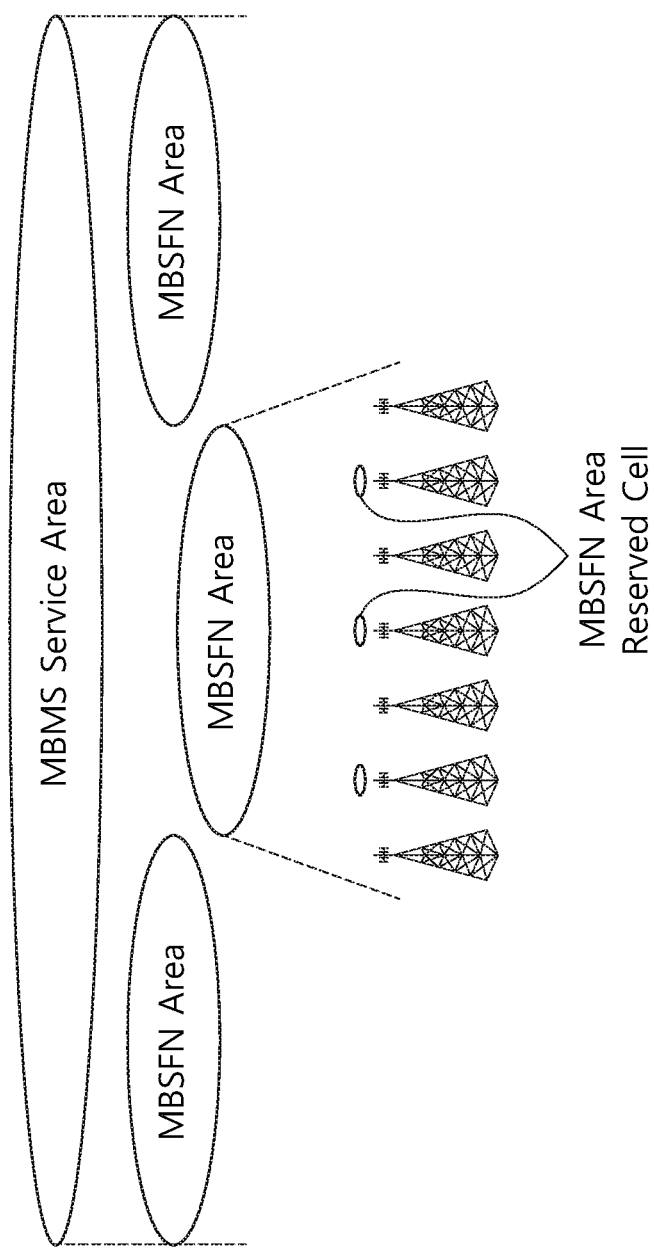
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

For MBMS transmission in an E-UTRAN, MBSFN transmission or SC-PTM transmission is used. An MCE determines which of SC-PTM and MBSFN is used for each MBMS session.

MBMS interest indication is described. The purpose of this procedure is to inform the E-UTRAN that the UE is receiving or is interested to receive MBMS via an MBMS radio bearer (MRB), and if so, to inform the E-UTRAN about the priority of MBMS versus unicast reception.

Figure 6:
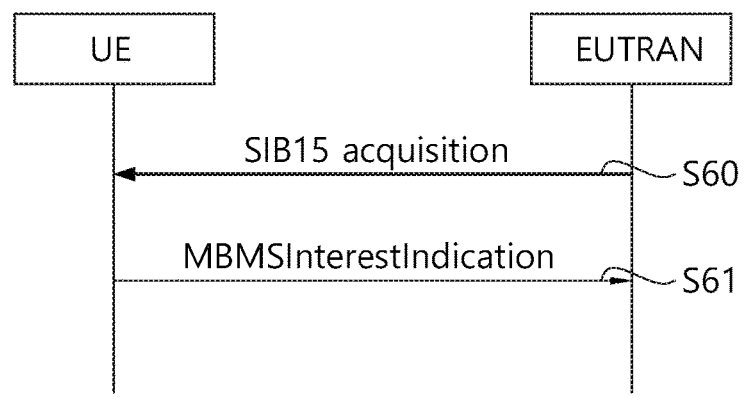
FIG. 6 shows an MBMS interest indication procedure.

FIG. 6 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a primary cell (PCell) broadcasting SystemInformationBlockType15.

Upon initiating the procedure, the UE shall:
1> if SystemInformationBlockType15 is broadcast by the PCell in step S60:
2> ensure having a valid version of SystemInformationBlockType15 for the PCell;
2> if the UE did not transmit an MBMSInterestIndication message since last entering RRC_CONNECTED; or
2> if since the last time the UE transmitted an MBMSInterestIndication message, the UE connected to a PCell not broadcasting SystemInformationBlockType15:

3> if the set of MBMS frequencies of interest is not empty:
4> initiate transmission of the MBMSInterestIndication message;
2> else:
3> if the set of MBMS frequencies of interest has changed since the last transmission of the MBMSInterestIndication message; or
3> if the prioritization of reception of all indicated MBMS frequencies compared to reception of any of the established unicast bearers has changed since the last transmission of the MBMSInterestIndication message:
4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:
1> consider a frequency to be part of the MBMS frequencies of interest if the following conditions are met:
2> at least one MBMS session the UE is receiving or interested to receive via an MRB is ongoing or about to start (the UE may determine whether the session is ongoing from the start and stop time indicated in the user service description (USD)); and
2> for at least one of these MBMS sessions SystemInformationBlockType15 acquired from the PCell includes for the concerned frequency one or more MBMS service area identifiers (SAIs) as indicated in the USD for this session (the UE considers a frequency to be part of the MBMS frequencies of interest even though the E-UTRAN may (temporarily) not employ an MRB for the concerned session. i.e., the UE does not verify if the session is indicated on MCCH); and
2> the UE is capable of simultaneously receiving the set of MBMS frequencies of interest, regardless of whether a serving cell is configured on each of these frequencies or not; and
2> the supportedBandCombination the UE included in UE-EUTRA-Capability contains at least one band combination including the set of MBMS frequencies of interest.

Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive. The term frequency does not indicate a physical frequency but covers the associated band(s), noting that additional bands may be indicated in SystemInformationBlockType1 (serving frequency) or SystemInformationBlockType15 (neighboring frequencies).

The UE shall set the contents of the MBMSInterestIndication message as follows:
1> if the set of MBMS frequencies of interest is not empty:
2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15. The mbms-FreqList merely indicates the physical frequencies the UE is interested to receive and does not imply the UE supports the associated band.
2> include mbms-Priority if the UE prioritizes reception of all indicated MBMS frequencies above reception of any of the unicast bearers. If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion. The UE shall submit the MBMSInterestIndication message to lower layers for transmission. Accordingly, in step S61, the UE transmits the MBMSInterestIndication message to the E-UTRAN.

Meanwhile, as one of Internet of Things (IoT) technologies, a narrowband IoT (NB-IoT) technology is emerging. NB-IoT is a low-power wide-area (LPWA) IoT technology using an LTE frequency, which is frequently used for tracking, sensing, and metering that involves the intermittent transmission of low-capacity data. A UE supporting the NB-IoT technology needs to be used for a long time without battery replacement and thus is required to operate with extremely low power.

A UE used in NB-IoT is required to operate with low power and thus supports only minimum functions for communication with a base station. For example, an NB-IoT UE does not support a measurement reporting function and a handover function. That is, even though the UE transmits an MBMS interest indication to a network, the network is unable to allow the UE to be handed over to an MBMS frequency. Thus, a conventional MBMS service continuity mechanism based on an MBMS interest indication may not provide the UE with the continuity of an MBMS service.

Figure 7:
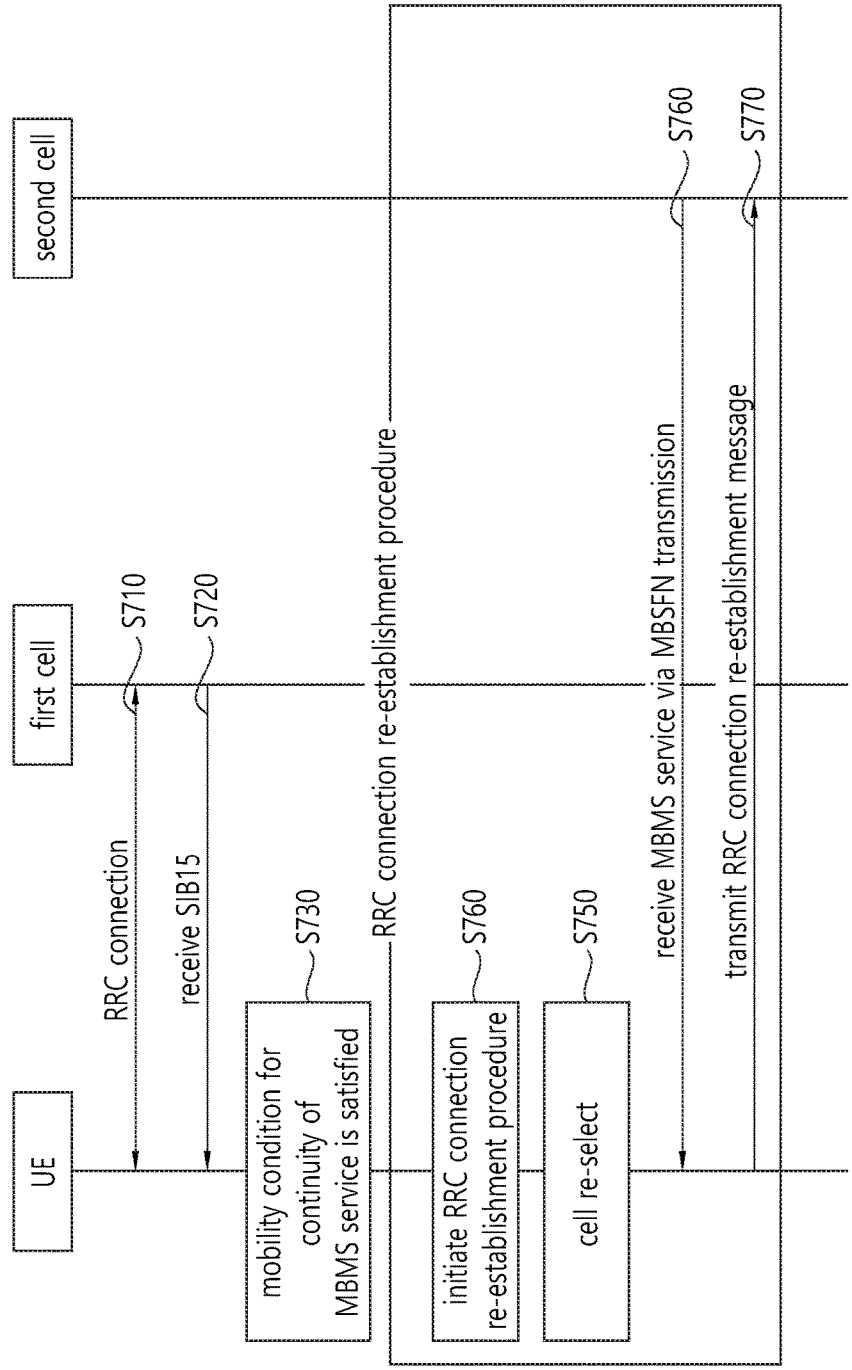
FIG. 7 is a flowchart illustrating a method for providing the continuity of an MBMS service according to one embodiment of the present invention.

Hereinafter, a method for providing the continuity of an MBMS service according to the present invention is described. According to the present invention, a UE not supporting a handover (NB-IoT UE) may enter an RRC idle mode when satisfying a certain condition, thereby providing the continuity of an MBMS service. According to embodiments of the present invention, when a UE in an RRC state that does not support UE-based mobility, that is, cell reselection, is interested in receiving an MBMS service through a broadcast, is unable to receive the MBMS service at a serving frequency, or is able to receive the MBMS service at a neighboring frequency, or when the MBMS service has just started or is soon to start (hereinafter, these four conditions are defined as mobility conditions for the continuity of an MBMS service), the UE
may initiate an RRC connection re-establishment procedure,
may enter the RRC idle mode, or
may consider that an RRC connection is suspended.
Hereinafter, each embodiment is described in detail.
FIG. 7 is a flowchart illustrating a method for providing the continuity of an MBMS service according to one embodiment of the present invention.

The present embodiment illustrates a method in which a UE initiates an RRC connection re-establishment procedure when a predetermined condition is satisfied. Specifically, before transmitting an RRC connection re-establishment request message, the UE performs cell reselection. After cell reselection is performed, when the UE is able to receive an MBMS service broadcast via a serving frequency (that is, a neighboring frequency before the cell reselection procedure), the UE may start to transmit the RRC connection re-establishment request message.

In step S710, the UE may be connected to a first cell. The UE is interested in receiving an MBMS service but is unable to receive the MBMS service of interest from a serving frequency. The serving frequency refers to a frequency provided by a serving cell, and the initial serving cell of the UE may be the first cell. That is, the first cell indicates a cell to which the UE is currently connected, and a second cell to be described later indicates a cell to which the UE is newly connected by a cell reselection procedure. The serving cell, which is a cell to which the UE is currently connected, may be referred to as a first cell before the cell reselection procedure, and may be referred to as a second cell after the cell reselection procedure.

In step S720, the UE may receive an MBMS-related system information block (SIB) from the first cell. The MBMS-related system information block includes information on the continuity of the MBMS service and may be, for example, SIB15.

In step S730, the UE may determine whether the UE satisfies a mobility condition for the continuity of the MBMS service. Specifically, the UE determines whether it is possible to receive the MBMS service of interest at a neighboring frequency through MBSFN transmission or SC-PTM transmission. The neighboring frequency indicates a frequency provided by a neighboring cell (second cell), instead of the first cell. According to one embodiment, the mobility condition for the continuity of the MBMS service includes a condition that the UE is interested in receiving the MBMS service, a condition that the MBMS service is not provided via a first frequency provided from the first cell, a condition that the MBMS service is provided via a second frequency provided from the second cell, and a condition that the MBMS service is already being provided or is to be provided within a set time.

In step S740, when the mobility condition for the continuity of the MBMS service is satisfied, the UE may initiate an RRC connection re-establishment procedure. Specifically, when it is determined that the MBMS service of interest may be received on the neighboring frequency, the UE may initiate the RRC connection re-establishment procedure before an MBMS session starts. The UE may know the start time of the MBMS session from a user service description (USD).

In step S750, the UE may consider the neighboring frequency at which the MBMS service of interest is provided as having the highest priority and may initiate a cell reselection procedure. That is, the UE may camp on the second cell providing the neighboring frequency with the highest priority.

In step S760, the UE may receive the MBMS service of interest from the second cell through MBSFN transmission or SC-PTM transmission.

In step S770, the UE may further transmit an RRC connection re-establishment request message to the second cell.

Figure 8:
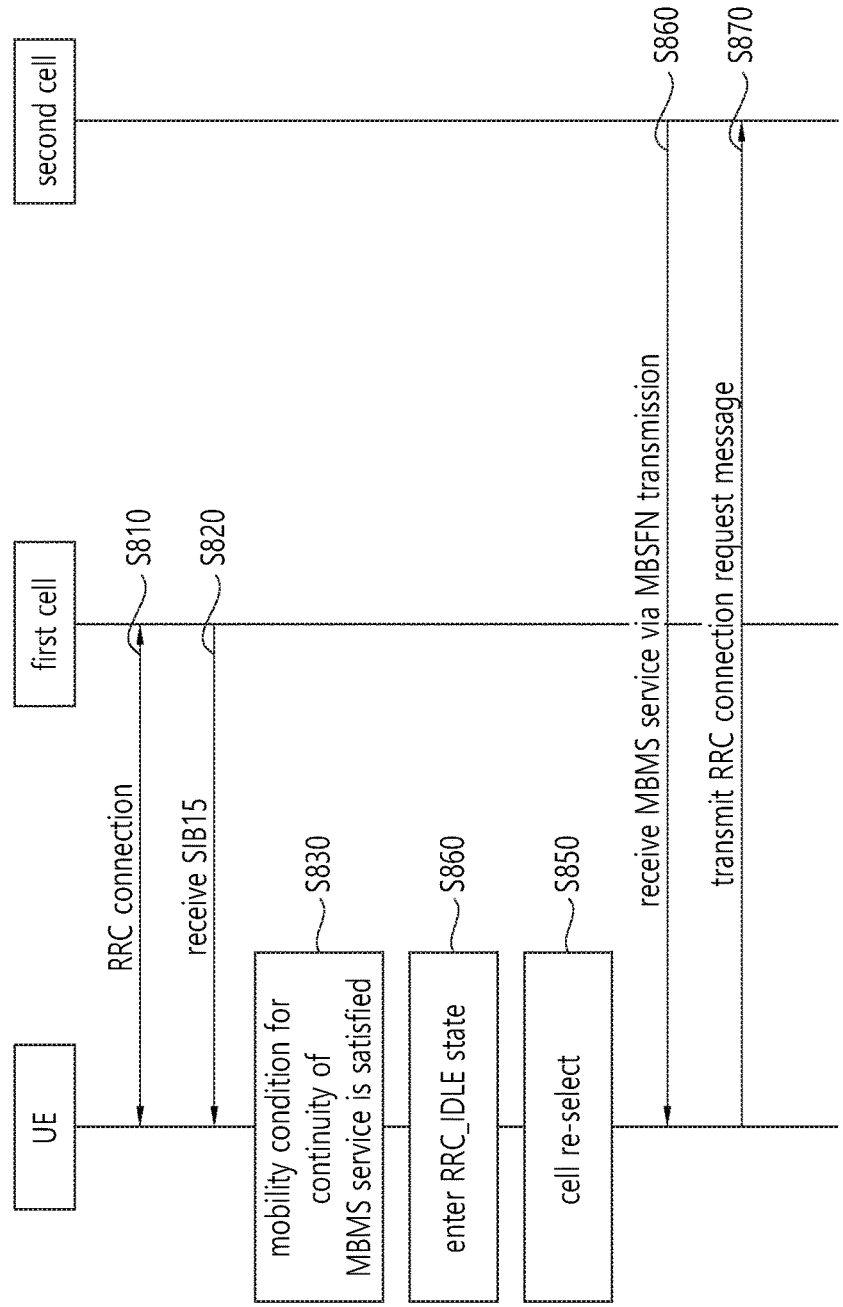
FIG. 8 is a flowchart illustrating a method for providing the continuity of an MBMS service according to one embodiment of the present invention.

FIG. 8 is a flowchart illustrating a method for providing the continuity of an MBMS service according to one embodiment of the present invention.

The present embodiment illustrates a method in which a UE enters the RRC idle mode when a predetermined condition is satisfied. Specifically, when the UE is interested in receiving an MBMS service through a broadcast, is unable to receive the MBMS service broadcast at a serving frequency, or is able to receive the MBMS service broadcast at a neighboring frequency or when the MBMS service has just started or is soon to start, the UE may enter the RRC idle mode and may perform a cell reselection procedure with respect to a cell on the neighboring frequency. After the cell reselection procedure, when the UE is able to receive the MBMS service broadcast via a serving frequency (that is, the neighboring frequency before the cell reselection procedure), the UE may start an RRC connection establishment procedure.

In step S810, the UE may be connected to a first cell. That is, the UE may be RRC-connected to the first cell. The UE is interested in receiving an MBMS service but is unable to receive the MBMS service of interest from a serving frequency. The serving frequency refers to a frequency provided by a serving cell, and the initial serving cell of the UE may be the first cell. That is, the first cell indicates a cell to which the UE is currently connected, and a second cell to be described later indicates a cell to which the UE is newly connected by a cell reselection procedure. The serving cell, which is a cell to which the UE is currently connected, may be referred to as a first cell before the cell reselection procedure, and may be referred to as a second cell after the cell reselection procedure.

In step S820, the UE may receive an MBMS-related system information block (SIB) from the first cell. The MBMS-related system information block includes information on the continuity of the MBMS service and may be, for example, SIB15.

In step S830, the UE may determine whether the UE satisfies a mobility condition for the continuity of the MBMS service. Specifically, the UE determines whether it is possible to receive the MBMS service of interest at a neighboring frequency through MBSFN transmission or SC-PTM transmission. The neighboring frequency indicates a frequency provided by a neighboring cell (second cell), instead of the serving cell (first cell). According to one embodiment, the mobility condition for the continuity of the MBMS service includes a condition that the UE is interested in receiving the MBMS service, a condition that the MBMS service is not provided via a first frequency provided from the first cell, a condition that the MBMS service is provided via a second frequency provided from the second cell, and a condition that the MBMS service is already being provided or is to be provided within a set time.

In step S840, when the mobility condition for the continuity of the MBMS service is satisfied, the UE may enter the RRC idle mode. Specifically, when it is determined that the MBMS service of interest may be received on the neighboring frequency, the UE enters the RRC idle mode before an MBMS session starts.

In step S850, the UE may consider the neighboring frequency at which the MBMS service of interest is provided as having the highest priority and may initiate a cell reselection procedure. That is, the UE may camp on the second cell providing the neighboring frequency with the highest priority.

In step S860, the UE may receive the MBMS service of interest from the second cell at the neighboring frequency through MBSFN transmission or SC-PTM transmission.

In step S870, the UE may further transmit an RRC connection request message to the second cell in order to restore a unicast service.

Figure 9:
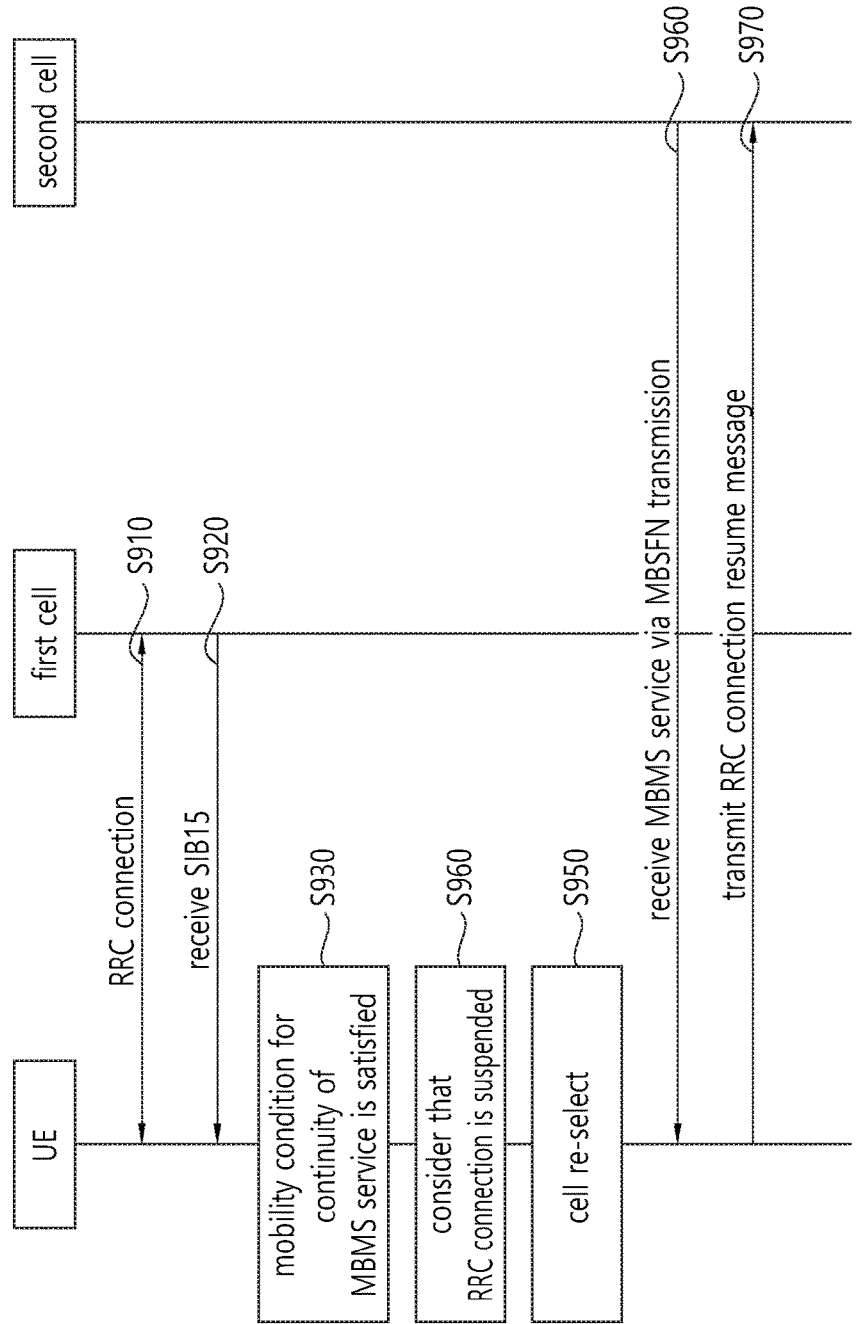
FIG. 9 is a flowchart illustrating a method for providing the continuity of an MBMS service according to one embodiment of the present invention.

FIG. 9 is a flowchart illustrating a method for providing the continuity of an MBMS service according to one embodiment of the present invention.

The present embodiment illustrates a method in which a UE considers that an RRC connection is suspended when a predetermined condition is satisfied. Specifically, the UE may consider that an RRC connection is suspended and may perform a cell reselection procedure. After the cell reselection procedure, when the UE is able to receive the MBMS service broadcast via a serving frequency (neighboring frequency before the cell reselection procedure), the UE may start transmitting an RRC connection resume request message (RRCConnectionResumeRequest message).

In step S910, the UE may be connected to a first cell. The UE is interested in receiving an MBMS service but is unable to receive the MBMS service of interest from a serving frequency. The serving frequency refers to a frequency provided by a serving cell, and the initial serving cell of the UE may be the first cell. That is, the first cell indicates a cell to which the UE is currently connected, and a second cell to be described later indicates a cell to which the UE is newly connected by a cell reselection procedure. The serving cell, which is a cell to which the UE is currently connected, may be referred to as a first cell before the cell reselection procedure, and may be referred to as a second cell after the cell reselection procedure.

In step S920, the UE may receive an MBMS-related system information block (SIB) from the first cell. The MBMS-related system information block includes information on the continuity of the MBMS service and may be, for example, SIB15.

In step S930, the UE may determine whether the UE satisfies a mobility condition for the continuity of the MBMS service. Specifically, the UE determines whether it is possible to receive the MBMS service of interest at a neighboring frequency through MBSFN transmission or SC-PTM transmission. The neighboring frequency indicates a frequency provided by a neighboring cell (second cell), instead of the first cell. According to one embodiment, the mobility condition for the continuity of the MBMS service includes a condition that the UE is interested in receiving the MBMS service, a condition that the MBMS service is not provided via a first frequency provided from the first cell, a condition that the MBMS service is provided via a second frequency provided from the second cell, and a condition that the MBMS service is already being provided or is to be provided within a set time.

In step S940, when the mobility condition for the continuity of the MBMS service is satisfied, the UE may consider that an RRC connection is suspended. Specifically, when it is determined that the MBMS service of interest may be received on the neighboring frequency, the UE considers that the RRC connection is suspended before an MBMS session starts.

In step S950, the UE may consider the neighboring frequency at which the MBMS service of interest is provided as having the highest priority and may initiate a cell reselection procedure. That is, the UE may camp on the second cell providing the neighboring frequency with the highest priority.

In step S960, the UE may receive the MBMS service of interest from the second cell through MBSFN transmission or SC-PTM transmission.

In step S970, the UE may further transmit an RRC connection resume request message to the second cell in order to restore a unicast service.

Figure 10:
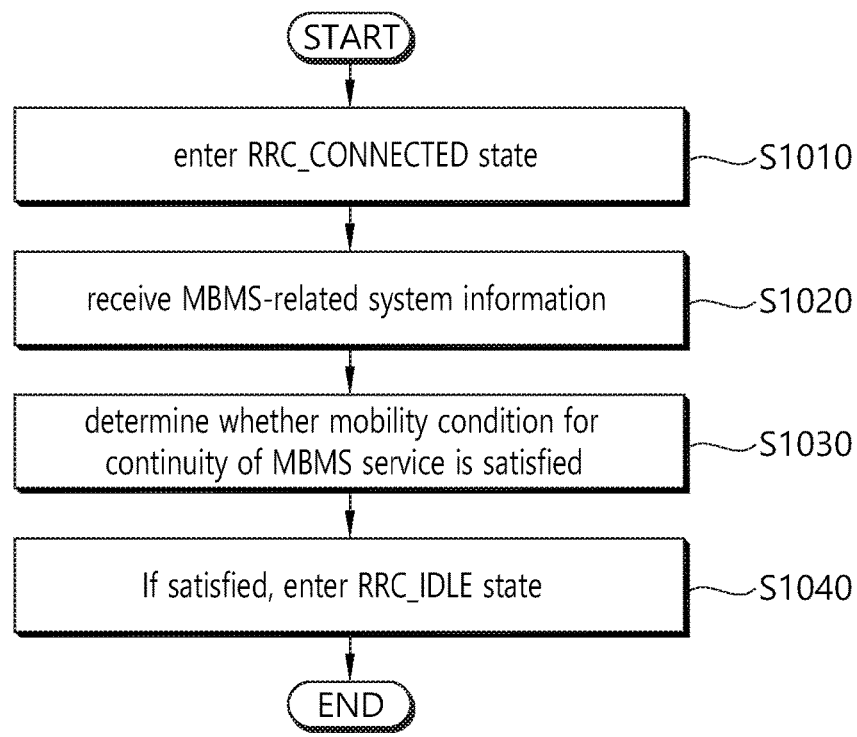
FIG. 10 is a flowchart illustrating a method for providing the continuity of an MBMS service according to one embodiment of the present invention.

FIG. 10 is a flowchart illustrating a method for providing the continuity of an MBMS service according to one embodiment of the present invention. In the present embodiment, a UE is an NB-IoT UE, which does not support a handover operation in the RRC connected state.

In step S1010, the UE may enter the RRC connected state with respect to a first cell.

In step S1020, the UE may receive MBMS-related system information from the first cell. The MBMS-related system information includes information on the continuity of an MBMS service and may be SIB15.

In step S1030, the UE may determine whether the UE satisfies a mobility condition for the continuity of the MBMS service. According to one embodiment, the mobility condition for the continuity of the MBMS service includes a condition that the UE is interested in receiving the MBMS service, a condition that the MBMS service is not provided via a first frequency provided from the first cell, a condition that the MBMS service is provided via a second frequency provided from a second cell, and a condition that the MBMS service is already being provided or is to be provided within a set time.

In step S1040, when the mobility condition is satisfied, the UE may enter the RRC idle state.

Subsequently, the UE may perform a cell reselection procedure with respect to the second cell. Accordingly, the UE may receive the MBMS service on the second frequency from the second cell. Here, the MBMS service of interest may be received through MBSFN transmission or SC-PTM transmission. Further, the UE may transmit an RRC connection request message to the second cell.

Figure 11:
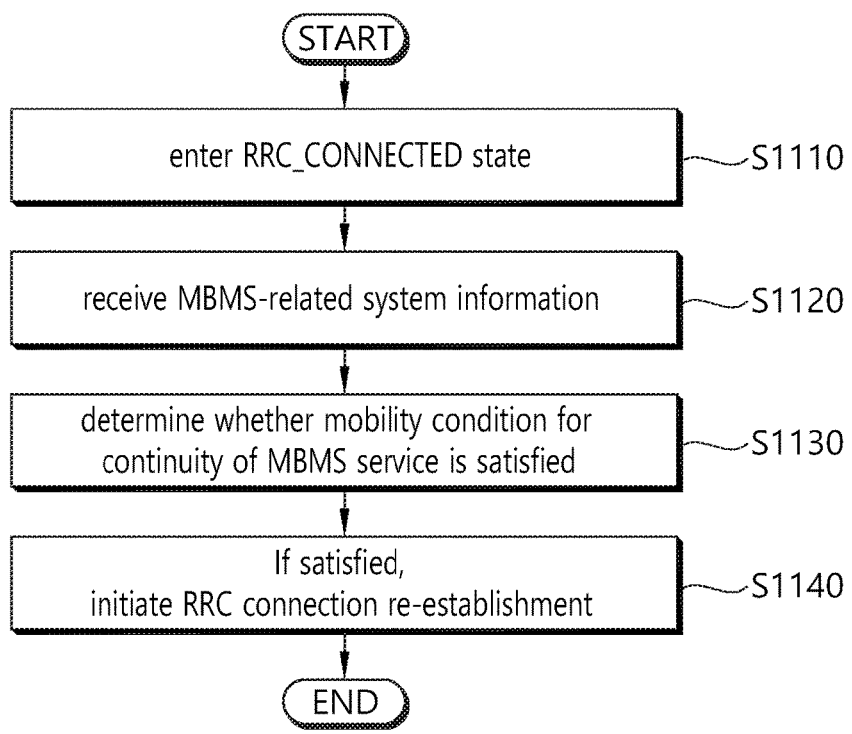
FIG. 11 is a flowchart illustrating a method for providing the continuity of an MBMS service according to another embodiment of the present invention.

FIG. 11 is a flowchart illustrating a method for providing the continuity of an MBMS service according to another embodiment of the present invention. In the present embodiment, a UE is an NB-IoT UE, which does not support a handover operation in the RRC connected state.

In step S1110, the UE may enter the RRC connected state with respect to a first cell.

In step S1120, the UE may receive MBMS-related system information from the first cell. The MBMS-related system information includes information on the continuity of an MBMS service and may be SIB15.

In step S1130, the UE may determine whether the UE satisfies a mobility condition for the continuity of the MBMS service. According to one embodiment, the mobility condition for the continuity of the MBMS service includes a condition that the UE is interested in receiving the MBMS service, a condition that the MBMS service is not provided via a first frequency provided from the first cell, a condition that the MBMS service is provided via a second frequency provided from a second cell, and a condition that the MBMS service is already being provided or is to be provided within a set time.

In step S1140, when the mobility condition is satisfied, the UE may initiate RRC connection re-establishment procedure to a cell which provides the MBMS service. The cell which provides the MBMS service may be the second cell on the second frequency. Accordingly, if the UE can not receive the MBMS service, the UE can perform the RRC connection re-establishment procedure to the cell providing the MBMS service by itself.

According to the related prior art, a UE may perform an RRC connection re-establishment procedure only in the case of a radio link failure (RLF), a HO failure, an integrity check failure, and an RRC connection reconfiguration failure.

Figure 12:
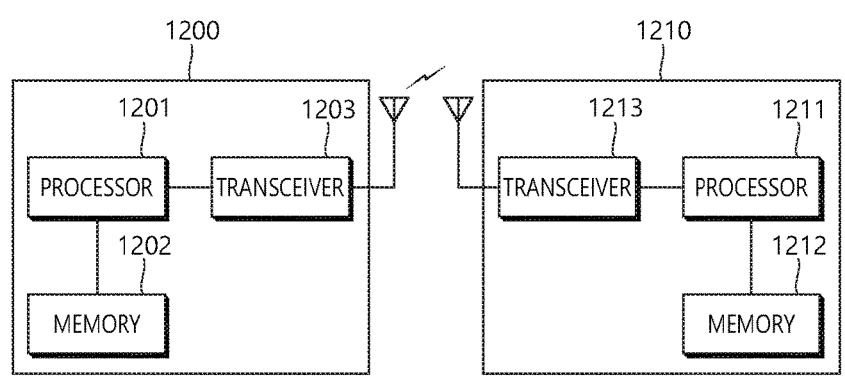
FIG. 12 shows a wireless communication system to implement an embodiment of the present invention.

FIG. 12 is a block diagram illustrating a wireless apparatus in which an embodiment of the present invention can be implemented.

A BS 1200 includes a processor 1201, a memory 1202, and a transceiver 1203. The memory 1202 is coupled to the processor 1201, and stores a variety of information for driving the processor 1201. The transceiver 1203 is coupled to the processor 1201, and transmits and/or receives a radio signal. The processor 1201 implements the proposed functions, procedures, and/or methods. In the aforementioned embodiments, an operation of the BS may be implemented by the processor 1201.

A UE 1210 includes a processor 1211, a memory 1212, and a transceiver 1213. The memory 1212 is coupled to the processor 1211, and stores a variety of information for driving the processor 1211. The transceiver 1213 is coupled to the processor 1211, and transmits and/or receives a radio signal. The processor 61 implements the proposed functions, procedures, and/or methods. In the aforementioned embodiments, an operation of the UE 1210 may be implemented by the processor 1211.

The processors 1211 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a narrow band (NB) internet of things (IoT) user equipment (UE) in a wireless communication system, the method comprising:
    entering a radio resource control (RRC) connected state with respect to a first cell;
    receiving multimedia broadcast multicast service (MBMS)-related system information from the first cell;
    entering an RRC idle state, when a mobility condition for continuity of an MBMS service is satisfied;
    performing a cell reselection procedure with respect to a second cell to receive the MBMS service, upon entering the RRC idle state; and
    receiving the MBMS service through multicast-broadcast single-frequency network (MBSFN) transmission or single cell point-to-multipoint (SC-PTM) transmission from the second cell,
    wherein the NB-IoT UE does not support handover operation from the first cell to the second cell, and
    wherein the mobility condition comprises:
        a condition that the NB-IoT UE is interested in receiving the MBMS service,
        a condition that the MBMS service is not provided via a first frequency provided by the first cell,
        a condition that the MBMS service is provided via a second frequency provided by the second cell, and
        a condition that the MBMS service is already being provided or is to be provided within a set time.

2. The method of claim 1, further comprising transmitting an RRC connection request message to the second cell after the performing of the cell reselection procedure.

3. The method of claim 1, wherein the MBMS-related system information is a system information block 15 (SIB15).

4. A narrow band (NB) internet of things (IoT) user equipment (UE) in a wireless communication system, the UE comprising:
    a memory;
    a transceiver; and
    a processor to connect the memory and the transceiver,
    wherein the processor is configured to:
        enter a radio resource control (RRC) connected state with respect to a first cell;
        control the transceiver to receive multimedia broadcast multicast service (MBMS)-related system information from the first cell;
        enter an RRC idle state, when a mobility condition for continuity of an MBMS service is satisfied;
        perform a cell reselection procedure with respect to a second cell to receive the MBMS service, upon entering the RRC idle state; and
        control the transceiver to receive the MBMS service through multicast-broadcast single-frequency network (MBSFN) transmission or single cell point-to-multipoint (SC-PTM) transmission from the second cell,
    wherein the NB-IoT UE does not support handover operation from the first cell to the second cell, and
    wherein the mobility condition comprises:
        a condition that the NB-IoT UE is interested in receiving the MBMS service,
        a condition that the MBMS service is not provided via a first frequency provided by the first cell,
        a condition that the MBMS service is provided via a second frequency provided by the second cell, and
        a condition that the MBMS service is already being provided or is to be provided within a set time.

5. The UE of claim 4, wherein the processor is configured to transmit an RRC connection request message to the second cell after the cell reselection procedure is performed.

6. The UE of claim 4, wherein the MBMS-related system information is a system information block 15 (SIB15).

* * * * *